United States Patent
Lendvay

(10) Patent No.: US 11,609,867 B2
(45) Date of Patent: Mar. 21, 2023

(54) ISOLATION COMPONENT

(71) Applicant: Micron Technology, Inc., Boise, ID (US)

(72) Inventor: William A. Lendvay, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/125,788

(22) Filed: Dec. 17, 2020

(65) Prior Publication Data

US 2021/0103531 A1  Apr. 8, 2021

Related U.S. Application Data

(63) Continuation of application No. 16/141,457, filed on Sep. 25, 2018, now Pat. No. 10,877,908.

(51) Int. Cl.
*G06F 13/16* (2006.01)
*G06F 13/42* (2006.01)
*G06F 3/06* (2006.01)

(52) U.S. Cl.
CPC ........ *G06F 13/1668* (2013.01); *G06F 3/0604* (2013.01); *G06F 3/068* (2013.01); *G06F 3/0659* (2013.01); *G06F 13/4282* (2013.01); *G06F 2213/0016* (2013.01)

(58) Field of Classification Search
None
See application file for complete search history.

(56) References Cited

U.S. PATENT DOCUMENTS

| | | | |
|---|---|---|---|
| 6,107,869 A * | 8/2000 | Horiguchi | G11C 5/147 327/566 |
| 6,209,074 B1 | 3/2001 | Dell et al. | |
| 6,295,226 B1 | 9/2001 | Yang | |
| 7,752,471 B1 * | 7/2010 | Kolokowsky | G06F 3/0676 713/300 |
| 8,325,511 B2 * | 12/2012 | Seshadri | G11C 11/417 365/189.11 |
| 8,553,488 B2 | 10/2013 | Campbell et al. | |
| 8,677,060 B2 * | 3/2014 | Chen | G06F 11/1441 711/170 |
| 10,013,354 B2 * | 7/2018 | Flynn | G06F 11/1471 |
| 2012/0314516 A1 | 12/2012 | Campbell et al. | |

(Continued)

*Primary Examiner* — Elias Mamo
(74) *Attorney, Agent, or Firm* — Brooks, Cameron & Huebsch, PLLC

(57) ABSTRACT

Systems, apparatuses, and methods related to an isolation circuit in a memory module are described. A dual-in line memory module (DIMM), for example, may include an isolation circuit to isolate components from one another in certain operating modes or phases of module operation. The isolation circuit may, for instance, isolate one integrated circuit (e.g., an electrically erasable read-only memory (EEPROM)) that includes serial presence detect (SPD) information from a controller (e.g., a field programmable gate array (FPGA)) if the controller is not energized. The isolation circuit may be employed in a non-volatile DIMM (NVDIMM), and an integrated circuit of the NVDIMM (e.g., an SPD EEPROM) may be isolated from an FPGA of the NVDIMM while the NVDIMM is de-energized. The isolation circuit may be employed in other examples to isolate or couple, or both, different components from or to one another.

19 Claims, 3 Drawing Sheets

---

SENDING ONLY A FIRST POWER SIGNAL OF A NUMBER OF POWER SIGNALS TO A FIRST COMPONENT — 240

ISOLATING A SECOND COMPONENT FROM THE FIRST COMPONENT, VIA AN ISOLATION COMPONENT, IN RESPONSE TO SENDING ONLY THE FIRST POWER SIGNAL, WHEREIN THE FIRST COMPONENT AND THE SECOND COMPONENT ARE COUPLED TO A BUS — 242

TRANSFERRING A NUMBER OF SIGNALS ON THE BUS BETWEEN THE FIRST COMPONENT AND A HOST VIA A CONNECTOR WHILE THE SECOND COMPONENT IS ISOLATED FROM THE FIRST COMPONENT — 244

(56) References Cited

U.S. PATENT DOCUMENTS

| | | | |
|---|---|---|---|
| 2016/0012866 A1* | 1/2016 | Byeon | G11C 29/021 365/226 |
| 2016/0172332 A1 | 6/2016 | Haba et al. | |
| 2017/0075829 A1 | 3/2017 | Lee et al. | |
| 2017/0177374 A1* | 6/2017 | Morning-Smith | G06F 11/1441 |
| 2018/0166140 A9 | 6/2018 | Hirose et al. | |

* cited by examiner

ISOLATION COMPONENT

PRIORITY INFORMATION

This application is a Continuation of U.S. application Ser. No. 16/141,457, filed Sep. 25, 2018, the contents of which are included herein by reference.

TECHNICAL FIELD

The present disclosure relates generally to memory devices, and more particularly, to apparatuses including an isolation component and methods using an isolation component.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Nonvolatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory can be part of a memory module (e.g., a dual in-line memory module (DIMM)) used in computing devices. Memory modules can include volatile, such as DRAM, for example, and/or non-volatile memory, such as Flash memory or RRAM, for example. The DIMMs can be using a main memory in computing systems.

DETAILED DESCRIPTION

Figure 1A:
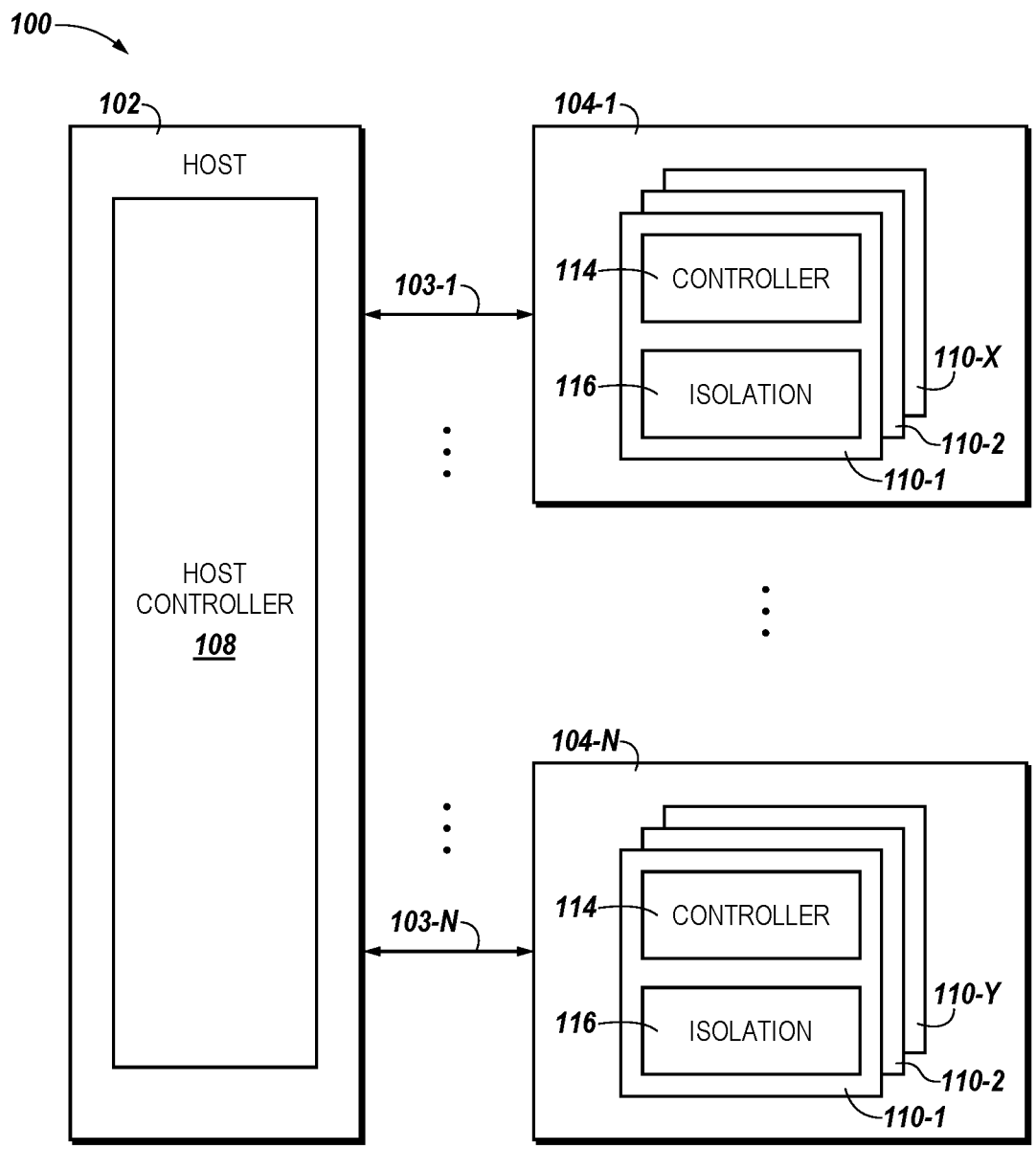
FIG. 1A is a block diagram of an apparatus in the form of a computing system including a memory system in accordance with a number of embodiments of the present disclosure.

Systems, apparatuses, and methods related to an isolation circuit in a memory module are described. A dual-in line memory module (DIMM), for example, may include an isolation circuit to isolate components from one another in certain operating modes or phases of module operation. The isolation circuit may, for instance, isolate one integrated circuit (e.g., an electrically erasable read-only memory (EEPROM)) that includes serial presence detect (SPD) information from a controller (e.g., a field programmable gate array (FPGA)) if the controller is not energized. The isolation circuit may be employed in a non-volatile DIMM (NVDIMM), and an integrated circuit of the NVDIMM (e.g., an SPD EEPROM) may be isolated from an FPGA of the NVDIMM while the NVDIMM is de-energized.

By way of example, an apparatus, such as a memory module, can include a number of components. The components can include a controller and/or memory devices, among other components. A memory module can include a bus coupled to the controller and the memory devices on the memory module. The bus can also couple the controller and the memory device to a connector, such as an edge connector, that can couple the memory module to a host. The memory module can receive commands from a host and transfer the signals associated with the commands to the controller and/or memory devices on the bus. A memory module can include memory device, such as a serial presence detect (SPD) EEPROM, on a memory module that can be powered by a power signal, such as Vdd SPD, while the memory module can also include a controller and other memory devices, such as a DRAM memory device and/or a Flash memory device, that can be powered by another power signal, such as Vdd DIMM. When the memory device is powered by Vdd SPD and the controller is not receiving power, an isolation device can isolate the controller from the EEPROM on the bus. The isolation device can isolate the controller from the SPD EEPROM, so that the signals sent to the SPD EEPROM on the bus will not be pulled down by the controller due to the controller not being energized. In a number of embodiments, an isolation device can isolate any component on a bus that is in an unpredictable state when not energized.

The isolation device can include a switch configured to receive a power signal and couples components on a bus in response to receiving the power signal (e.g., switch is closed) and isolates components on the bus in response to an absence of the power signal (e.g., switch is open).

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more of such things. For example, a number of memory devices can refer to one or more of memory devices. Additionally, designators such as "Z", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1A is a functional block diagram of a computing system 100 including an apparatus in the form of a number of memory systems 104-1 . . . 104-N, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1A, memory systems 104-1 . . . 104-N can include a one or more dual in-line memory modules (DIMM) 110-1, . . . , 110-X, 110-Y. The DIMMs 110-1, . . . , 110-X, 110-Y can include volatile memory and/or non-volatile memory. In a number of embodiments, memory systems 104-1, . . . , 104-N can include a multi-chip device. A multi-chip device can include a number of different memory types and/or memory modules. For example, a memory system can include non-volatile or volatile memory on any type of a module. The examples described below in association with FIGS. 1A-1B use a DIMM as the memory module, but the embodiments of the present disclosure can be used on systems that include components that are energized by a power signal and are in an unpredictable state when not energized. In FIG. 1A, memory system 104-1 coupled to the host via channel 103-1 can include DIMMs 110-1, . . . , 110-X, where DIMM 110-1 is a NVDIMM and 110-X is DRAM DIMM. In this example, each DIMM 110-1, . . . , 110-X, 110-Y includes a controller 114. Controller 114 can receive commands from host 102 and control execution of the commands on a DIMM. Also, in a number of embodiments, the protocol of the present disclosure could be implemented by a memory device (e.g., a DIMM) without a controller and execution of the commands using the protocol of the present disclosure could be built into the memory device. The host 102 can send commands to the DIMMs 110-1, . . . , 110-X, 110-Y using the protocol of the present disclosure and/or a prior protocol, depending on the type of memory in the DIMM. For example, the host can use the protocol of the present disclosure to communicate on the same channel (e.g., channel 103-1) with a NVDIMM and a prior protocol to communicate with a DRAM DIMM that are both on the same memory system 104.

DIMMs 110-1, . . . , 110-X, 110-Y can include isolation component 116. Isolation component 116 can be configured to isolate component on DIMMs 110-1, . . . , 110-X, 110-Y from each other when receiving commands from host 102 and/or controller 114. For example, each of the DIMMs 110-1, . . . , 110-X, 110-Y can include a number of components include memory devices, controllers 114, isolation component 116, register clock driver (RCD), and/or an EEPROM 118, among other components. Isolation component 116 can be configured to isolate a particular component on the DIMMs 110-1, . . . , 110-X, 110-Y from other components on the DIMMs 110-1, . . . , 110-X, 110-Y when the particular component is not energized but other components are energized. When the particular component is powered by a power supply and other components are not powered by another power supply, the other components can pull down the signals sent to the particular component. Isolation device 116 can isolate the particular component from the other components, so that the signals sent to the particular component will not be pulled down by the other components.

As illustrated in FIG. 1A, host 102 can be coupled to the memory systems 104-1 . . . 104-N. In a number of embodiments, each memory system 104-1 . . . 104-N can be coupled to host 102 via a channel (e.g., channels 103-1, . . . , 103-N). In FIG. 1A, memory system 104-1 is coupled to host 102 via channel 103-1 and memory system 104-N is coupled to host 102 via channel 103-N. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Host 102 includes a host controller 108 to communicate with memory systems 104-1 . . . 104-N. The host controller 108 can send commands to the DIMMs 110-1, . . . , 110-X, 110-Y via channels 103-1 . . . 103-N. The host controller 108 can communicate with the DIMMs 110-1, . . . , 110-X, 110-Y and/or the controller 114 on each of the DIMMs 110-1, . . . , 110-X, 110-Y to read, write, and erase data, among other operations. A physical host interface can provide an interface for passing control, address, data, and other signals between the memory systems 104-1 . . . 104-N and host 102 having compatible receptors for the physical host interface. The signals can be communicated between host 102 and DIMMs 110-1, . . . , 110-X, 110-Y on a number of buses, such as a data bus and/or an address bus, for example, via channels 103-1 . . . 103-N.

The host controller 108 and/or controller 114 on a DIMM can include control circuitry, e.g., hardware, firmware, and/or software. In one or more embodiments, the host controller 108 and/or controller 114 can be an application specific integrated circuit (ASIC) and/or a field programmable gate array (FPGA) coupled to a printed circuit board including a physical interface. Also, each DIMM 110-1, . . . , 110-X, 110-Y can include buffers of volatile and/or non-volatile memory and registers.

The DIMMs 110-1, . . . , 110-X, 110-Y can provide main memory for the memory system or could be used as additional memory or storage throughout the memory system. Each DIMM 110-1, . . . , 110-X, 110-Y can include one or more arrays of memory cells, e.g., volatile and/or non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1A can include additional circuitry that is not illustrated so as not to obscure embodiments of the present disclosure. For example, the memory systems 104-1 . . . 104-N can include address circuitry to latch address signals provided over I/O connections through I/O circuitry. Address signals can be received and decoded by a row decoder and a column decoder to access the DIMMs 110-1, . . . , 110-X, 110-Y. It will be appreciated by those skilled in the art that the number of address input connections can depend on the density and architecture of the DIMMs 110-1, . . . , 110-X, 110-Y.

Figure 1B:
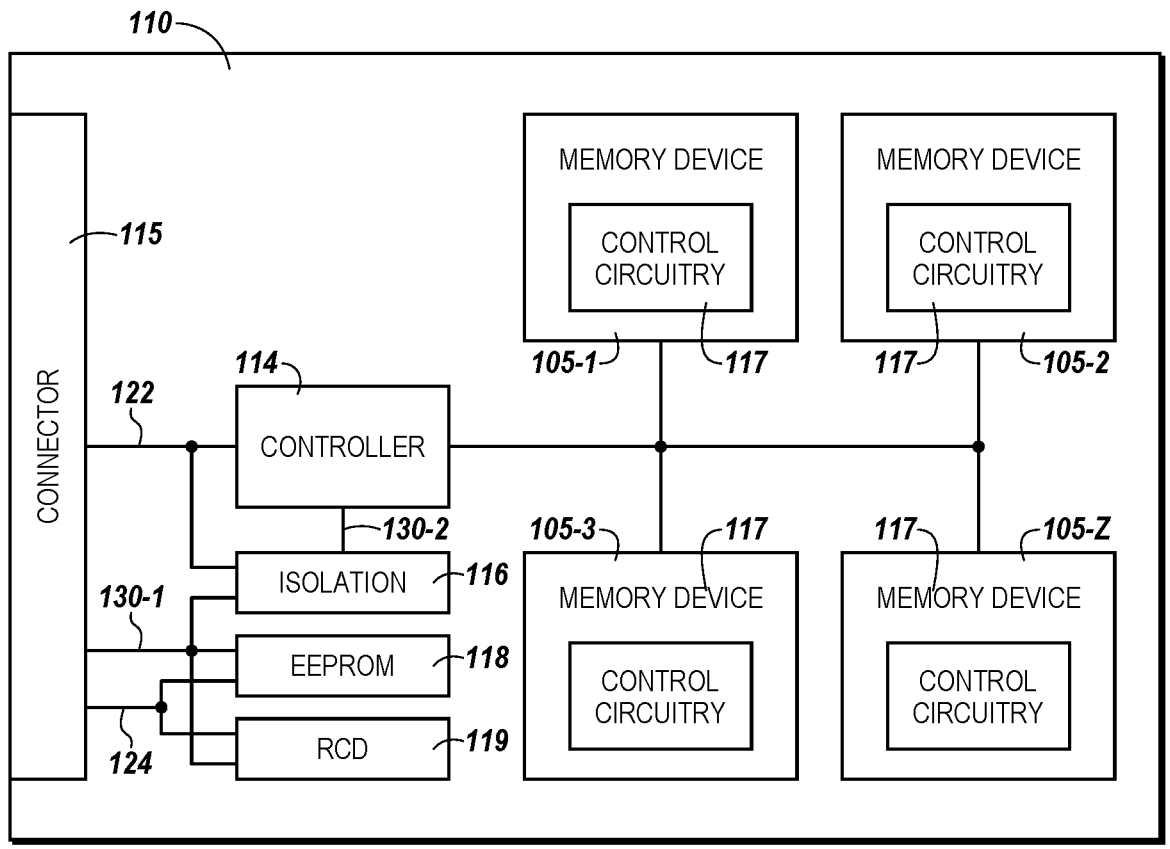
FIG. 1B is a block diagram of an apparatus in the form of a dual in-line memory modules (DIMM) in accordance with a number of embodiments of the present disclosure.

FIG. 1B is a block diagram of an apparatus in the form of a dual in-line memory modules (DIMM) 110 in accordance with a number of embodiments of the present disclosure. In FIG. 1B, DIMM 110 can include a controller 114. Controller 114 can include memory, such as SRAM memory, that can be a buffer and/or a number of registers used when transferring signals associated with the data and/or commands executed on DIMM 110. DIMM 110 can include a number of memory devices 105-1, . . . , 105-Z coupled to the controller. Memory devices 105-1, . . . , 105-Z can be volatile and/or non-volatile memory devices, and include non-volatile memory arrays and/or volatile memory arrays. Memory devices 105-1, . . . , 105-Z can include control circuitry 117 (e.g., hardware, firmware, and/or software) which can be used to execute commands on the memory devices 105-1, . . . , 105-Z. The control circuitry 117 can receive commands from controller 114. The control circuitry 117 can be configured to execute commands to read and/or write data in the memory devices 105-1, . . . , 105-Z.

DIMM 110 includes controller 114, which can be an application specific integrated circuit (ASIC) and/or a field programmable gate array (FPGA) and can send and received signals to execute commands on the components of the DIMM. DIMM 110 includes SPD EEPROM 118, RCD 119, isolation component 116, and controller 114 coupled to each other and connector 115 via a bus that is separated into two portions 130-1 and 130-2 by isolation device 116. Bus 130-1 and 130-2 can be an I2C bus, for example.

DIMM 110 includes connector 115, which can be an edge connector. Connector 115 can couple DIMM 110 to other components of a memory system (e.g., other DIMMs) and/or a computing system (e.g., a host). Connector 115 can include power supply 122 and power supply 124. Power supply 122 can be Vdd DIMM to power the controller 114 and memory devices 113-1, . . . , 113-Z. Power supply 124 can be Vdd SPD to power the EEPROM 118 and/or RCD 119.

When EEPROM 118 and/or RCD 119 are powered by power supply 124 and controller 114 is not powered by power supply 122, isolation component 116 can be configured to isolate controller 114 from EEPROM 118 and/or RCD 119. Isolation component 116 can include a switch that is open when isolation component 116 is not receiving power supply 122. Isolation component 116 can prevent controller 114 from pulling down signals on bus 130-1 that are sent to EEPROM 118 and/or RCD 119 from a host via connector 115 by separating bus into two portions 130-1 and 130-2 and electrically isolating controller 114 from other components coupled together on the first portion of the bus 130-1.

When EEPROM 118 and/or RCD 119 are powered by power supply 124 and controller 114 is powered by power supply 122, isolation component 116 can be configured to coupled controller 114 to EEPROM 118 and/or RCD 119 via bus 130-1 and 130-2. Isolation component 116 can include a switch that is closed when isolation component 116 is receiving power supply 122 and signals on bus 130-1 and 130-2 can be sent from a host and/or controller 114 to EEPROM 118 and/or RCD on bus 130-1 and 130-2.

Figure 2:
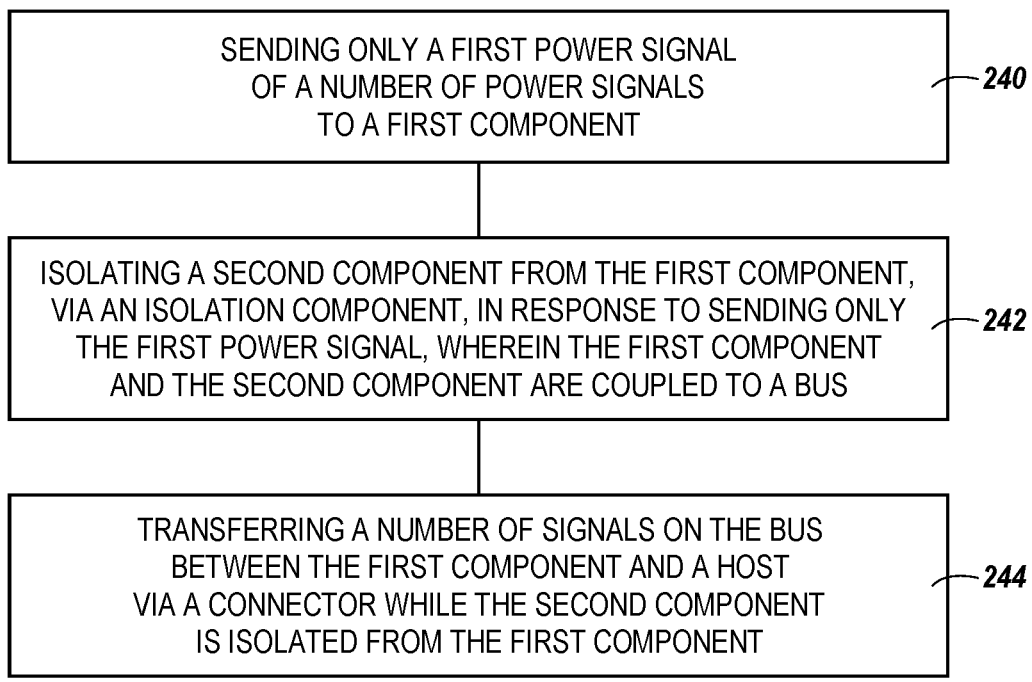
FIG. 2 is a flow diagram illustrating an example operation in a memory system using an isolation device in accordance with a number of embodiments of the present disclosure.

FIG. 2 is a flow diagram illustrating an example operation in a memory system using an isolation device in accordance with a number of embodiments of the present disclosure. The process described in FIG. 2 can be performed by, for example, a memory system including a DIMM such as DIMM 110 shown in FIG. 1B.

At block 240, the example operation can include sending only a first power signal of a number of power signals to a first component. The number of power signal can include power signals to provide power to energize components. For example, the first power signal can be a serial presence detect (SPD) power supply signal to energize an electrically erasable programmable read-only memory (EEPROM) and/or a register clock drive (RCD). A second power signal can be a memory module power supply signal to energize a controller and memory devices of a memory module.

At block 242, the example operation can include isolating a second component from the first component, via an isolation component, in response to sending only the first power signal, wherein the first component and the second component are coupled to a bus. The isolation component can be coupled to a second power signal and include a switch that is configured to be open when not receiving the second power signal and be closed when receiving the second power signal. When the switch of the isolation component is open, the isolation component can isolation the first component from the second component. When the switch of the isolation component is closed, the isolation component can coupled, via a bus, the first component to the second component.

At block 244, the example operation can include transferring a number of signals on the bus between the first component and a host via a connector while the second component is isolated from the first component.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
 a controller for one or more components of a memory module coupled to a bus of the memory module;
 a programmable memory array coupled to the bus of the memory module; and
 an isolation component coupled to the bus of the memory module between the controller and the programmable memory array, wherein the isolation component is configured to isolate the controller from the programmable memory array on the bus of the memory module via a switch that is open in response to an absence of a first power signal on the controller, wherein the programmable memory array is powered by a second power signal when the switch is open in response to the absence of the first power signal, and wherein the first power signal is configured to power a memory device coupled to the controller and the second power signal is configured to power the programmable memory array.

2. The apparatus of claim 1, wherein the controller comprises a field programmable gate array (FPGA), the programmable memory array comprises an electrically erasable programmable read-only memory (EEPROM), and the bus comprises an inter-integrated circuit (I2C) bus.

3. The apparatus of claim 2, wherein:
the programmable memory array comprises serial presence detect (SPD) information for the memory module;
the memory device comprises a dynamic random access memory (DRAM) coupled to a NAND array that is configured to store contents of the DRAM upon a loss of power to the memory module; and
the programmable memory array is accessible via the bus without energizing the DRAM or NAND array.

4. The apparatus of claim 1, wherein the isolation component is configured to couple the controller to the programmable memory array via the switch that is closed in response to the controller receiving the first power signal.

5. The apparatus of claim 1, wherein isolation component comprises the switch that is configured to be closed in response to receiving the first power signal and is configured to be open in response to not receiving the first power signal.

6. The apparatus of claim 1, wherein the controller and the programmable memory array are configured to transfer commands and data on the bus to a host.

7. The apparatus of claim 1, wherein the programmable memory array is configured to receive the second power signal while the isolation component isolates the controller from the programmable memory array.

8. The apparatus of claim 1, wherein the programmable memory array is configured to transfer commands and data on the bus to a host while the isolation component isolates the controller from the programmable memory array.

9. An apparatus, comprising:
a first memory device coupled to a bus; and
a controller coupled to the bus;
wherein the first memory device and the controller are coupled together by an isolation component and are configured to transfer data on the bus in response to the controller receiving a first power signal and the first memory device receiving a second power signal, wherein the first memory device and the controller are isolated from each other by the isolation component in response to an absence of the first power signal on the controller, wherein the first memory device is powered by the second power signal in response to the absence of the first power signal, wherein the first power signal is a memory module power supply signal to power the controller and a number of second memory devices, and wherein the second power signal is a serial presence detect (SPD) power supply signal to power the first memory device.

10. The apparatus of claim 9, wherein the first memory device is configured to receive signals on the bus in response to receiving the second power signal while the first memory device is isolated from the controller by the isolation component.

11. The apparatus of claim 9, wherein the first memory device is an electrically erasable programmable read-only memory (EEPROM) and the controller includes a field programmable gate array (FPGA).

12. The apparatus of claim 9, wherein the first memory device and the controller are coupled to an edge connector via the bus.

13. The apparatus of claim 9, wherein the apparatus is a non-volatile dual in-line memory module (NVDIMM).

14. A method, comprising:
isolating a first component from a second component, via an isolation component, in response to sending a first power signal to the second component and in response to an absence of a second power signal on the first component, wherein the first component and the second component are coupled to a bus, wherein the first power signal is configured to provide power to only an electrically erasable programmable read-only memory (EEPROM) and a register clock driver (RCD), and wherein the second power signal is configured to power a controller of a memory system and volatile and non-volatile memory of the memory system; and
transferring a number of signals on the bus between the second component and a host via a connector while the first component is isolated from the second component.

15. The method of claim 14, further comprising sending the first power signal to the second component and a second power signal to the first component.

16. The method of claim 15, wherein further comprising coupling the first component to the connector via the isolation component in response to sending the first power signal to the second component and the second power signal to the first component.

17. The method of claim 15, further comprising transferring the number of signals on the bus between the first component, the second component and a host via the connector while sending the first power signal to the second component and the second power signal to the first component.

18. The method of claim 15, wherein sending the second power signal to the first component provides power to the controller coupled to the volatile and non-volatile memory of the memory system.

19. The method of claim 14, wherein sending the first power signal to the second component provides power to the electrically erasable programmable read-only memory (EEPROM).

* * * * *